US011720373B2

(12) United States Patent
Lee et al.

(10) Patent No.: US 11,720,373 B2
(45) Date of Patent: Aug. 8, 2023

(54) DATA PLANE PROGRAM VERIFICATION

(71) Applicant: Barefoot Networks, Inc., Santa Clara, CA (US)

(72) Inventors: Jeongkeun Lee, Los Altos, CA (US); Cole Nathan Schlesinger, Mountain View, CA (US); John Nathan Foster, Ithaca, NY (US); Han Wang, San Jose, CA (US); Robert Soule, Hamden, CT (US); William Hallahan, Nashua, NH (US); Steffen Julif Smolka, Ithaca, NY (US); Mon Jed Liu, Santa Clara, CA (US)

(73) Assignee: Barefoot Networks, Inc., Santa Clara, CA (US)

( * ) Notice: Subject to any disclaimer, the term of this patent is extended or adjusted under 35 U.S.C. 154(b) by 0 days.

(21) Appl. No.: 17/537,301

(22) Filed: Nov. 29, 2021

(65) Prior Publication Data

US 2022/0083352 A1     Mar. 17, 2022

Related U.S. Application Data

(63) Continuation of application No. 16/022,601, filed on Jun. 28, 2018, now Pat. No. 11,188,355.
(Continued)

(51) Int. Cl.
*G06F 9/445* (2018.01)
*G06F 11/36* (2006.01)
(Continued)

(52) U.S. Cl.
CPC ............ *G06F 9/44589* (2013.01); *G06F 8/51* (2013.01); *G06F 11/3604* (2013.01);
(Continued)

(58) Field of Classification Search
CPC .... G06F 9/44589; G06F 8/51; G06F 11/3604; G06F 11/3608; G06F 11/3636; H04L 45/745
See application file for complete search history.

(56) References Cited

U.S. PATENT DOCUMENTS 6,112,298 A      8/2000   Deao et al.
6,986,130 B1 *   1/2006   Boucher ............... G06F 8/4441
                                                   717/150
(Continued)

OTHER PUBLICATIONS

P. Bosshart et al., "Public Review for Programming Protocol—Independent Packet Processors", Jul. 2014, ACM SIGCOMM Computer Communication Review, vol. 44 (Year: 2014).*
(Continued)

*Primary Examiner* — Douglas M Slachta
(74) *Attorney, Agent, or Firm* — Essential Patents Group, LLP; Christopher K. Gagne

(57) ABSTRACT

A method for verifying data plane programs is provided in some embodiments. Because the behavior of a data plane program (e.g., a program written in the P4 language) is determined in part by the control plane populating match-action tables with specific forwarding rules, in some embodiments, programmers are provided with a way to document assumptions about the control plane using annotations (e.g., in the form of "assertions" or "assumptions" about the state based on the unknown control plane contribution). In some embodiments, annotations are added automatically to verify common properties, including checking that every header read or written is valid, that every expression has a well-defined value, and that all standard metadata is manipulated correctly. The method in some embodiments translates programs from a first language (e.g., P4) to a
(Continued)

second language (e.g., Guarded Command Language (GCL)) for verification by a satisfiability modulo theory (SMT) solver.

18 Claims, 11 Drawing Sheets

Related U.S. Application Data

(60) Provisional application No. 62/663,141, filed on Apr. 26, 2018, provisional application No. 62/571,121, filed on Oct. 11, 2017.

(51) Int. Cl.
*G06F 8/51* (2018.01)
*H04L 45/745* (2022.01)

(52) U.S. Cl.
CPC ...... *G06F 11/3608* (2013.01); *G06F 11/3636* (2013.01); *H04L 45/745* (2013.01)

(56) References Cited

U.S. PATENT DOCUMENTS

| | | | |
|---|---|---|---|
| 7,200,865 B1* | 4/2007 | Roscoe | H04L 63/20 726/13 |
| 7,263,597 B2* | 8/2007 | Everdell | H04L 47/10 709/201 |
| 7,685,570 B2 | 3/2010 | Draine et al. | |
| 7,987,390 B2 | 7/2011 | Chandrasekaran | |
| 8,387,021 B2 | 2/2013 | Vanoverberghe et al. | |
| 8,793,661 B1 | 7/2014 | Fei et al. | |
| 9,419,897 B2 | 8/2016 | Cherian et al. | |
| 9,577,924 B2 | 2/2017 | Ko et al. | |
| 9,767,284 B2 | 9/2017 | Ghose | |
| 9,773,557 B2* | 9/2017 | Goto | G11C 16/10 |
| 10,009,264 B2 | 6/2018 | Hoffmann | |
| 10,097,457 B1 | 10/2018 | Srinivasan et al. | |
| 10,305,776 B2 | 5/2019 | Horn et al. | |
| 10,320,585 B2 | 6/2019 | Koponen et al. | |
| 10,409,705 B2 | 9/2019 | Jagadeesan et al. | |
| 2003/0217327 A1 | 11/2003 | Ogasawara | |
| 2009/0228967 A1 | 9/2009 | Gbadegesin et al. | |
| 2009/0248693 A1 | 10/2009 | Sagar et al. | |
| 2011/0145653 A1 | 6/2011 | Broadfoot et al. | |
| 2012/0060165 A1 | 3/2012 | Clarke | |
| 2013/0060736 A1 | 3/2013 | Casado et al. | |
| 2013/0346814 A1 | 12/2013 | Zadigian et al. | |
| 2014/0237456 A1 | 8/2014 | Monclus et al. | |
| 2016/0072769 A1 | 3/2016 | Takuwa et al. | |
| 2016/0224460 A1* | 8/2016 | Bryant | G06F 8/60 |
| 2016/0344798 A1* | 11/2016 | Kapila | H04L 67/10 |
| 2018/0367393 A1* | 12/2018 | Harneja | H04L 41/0873 |

OTHER PUBLICATIONS

Ryan Beckett et al., "An Assertion Language for Debugging SDN Applications", Aug. 22, 2014, ACM (Year: 2014).*
Thomas Ball et al., "VeriCon: Towards Verifying Controller Programs in Software-Defined Networks", Jun. 2014, ACM (Year: 2014).*
Yangyang Wang et al., "A tool fortracing network data plane via SDN/OpenFlow", Feb. 2017, Science China Information Sciences (Year: 2017).*
First Office Action for U.S. Appl. No. 16/022,601, dated May 1, 2020, 31 pages.
Lopes, Nuno P., et al., "Automatically verifying reachability and well-formedness in P4 Networks", Microsoft Research, Sep. 2016, 13 pages.
Notice of Allowance for U.S. Appl. No. 16/022,601, dated Jun. 29, 2021, 10 pages.
Notice of Allowance for U.S. Appl. No. 16/022,601, dated Nov. 17, 2020, 10 pages.
Ryan Beckett et al., "An Assertion Language for Debugging SON Applications", Aug. 22, 2014, ACM (Year: 2014).
Yangyang Wang et al., "A tool for tracing network data plane via SON/Open Flow", Feb. 2017, Science China Information Sciences (Year: 2017).

* cited by examiner

```
1  header_type ethernet_t {
2    fields {
3      dstAddr : 48;
4      srcAddr : 48;
5      etherType : 16;
6    }
7  }
8  header_type vlan_tag_t {
9    fields {
10     pcp : 3;
11     cfi : 1;
12     vid : 12;
13     etherType : 16;
14   }
15 }
16 header ethernet_t ethernet;
17 header vlan_tag_t vlan[2];
18 parser start {
19   extract(ethernet);
20   return select(ethernet.etherType) {
21     0x8100: parse_vlan;
22     0x9100: parse_qinq;
23     default: ingress;
24   }
25 }
26 parser parse_vlan {
27   extract(vlan[next]);
28   return ingress;
29 }
30 parser parse_qinq {
31   extract(vlan[0]);
32   return select(vlan[0].etherType) {
33     0x8100: parse_vlan;
34     default : ingress;
35   }
36 }
```

*Figure 3A*

```
36  }
37  action nop() { }
38  action remove_single_tag() {
39    modify_field(ethernet.etherType, vlan[0].etherType);
40    remove_header(vlan[0]);
41  }
42  action remove_double_tag() {
43    modify_field(ethernet.etherType, vlan[1].etherType);
44    remove_header(vlan[0]);
45    remove_header(vlan[1]);
46  }
47  table decap {
48    reads {
49      vlan[0] : valid;
50      vlan[1] : valid;
51    }
52    actions {
53      nop;
54      remove_single_tag;
55      remove_double_tag;
56    }
57  }
58  control ingress {
59    apply(decap);
60    @pragma assert not(valid(vlan[0]) or valid(vlan[1]))
61  }
```

325 → line 47
320 → line 58

*Figure 3B*

```
1 @pragma assume hit(decap)
2 @pragma assume action(decap) == nop \
3   iff (reads(decap)[0] == 0 and reads(decap)[1] == 0)
4 @pragma assume action(decap) == remove_single_tag \
5   iff (reads(decap)[0] == 1 and reads(decap)[1] == 0)
6 @pragma assume action(decap) == remove_double_tag \
7   iff (reads(decap)[0] == 1 and reads(decap)[1] == 1)
```

*Figure 4*

$$
\begin{array}{lll}
\text{Variables} & x & \\
\text{Expressions} & e & \\
\text{Predicates} & P ::= e_1 = e_2 & \textit{Equality} \\
& \mid P_1 \land P_2 & \textit{Conjunction} \\
& \mid P_1 \lor P_2 & \textit{Disjunction} \\
& \mid P_1 \implies P_2 & \textit{Implication} \\
& \mid \neg P & \textit{Negation} \\
\text{Commands} & c ::= x := e & \textit{Assignment} \\
& \mid c_1; c_2 & \textit{Sequence} \\
& \mid c_1 \,[]\, c_2 & \textit{Choice} \\
& \mid \textit{assume}(P) & \textit{Assumption} \\
& \mid \textit{assert}(P) & \textit{Assertion} \\
\end{array}
$$

*Figure 5*

Tables          $t$
Actions         $a$
Keys            $k$
Expressions     $e ::= \ldots$
                | $reaches(t)$              Reaches
                | $reads(t, k)$             Reads
                | $wildcard(t, k)$          Wildcarded
                | $hit(t)$                  Hits
                | $miss(t)$                 Misses
                | $action(t)$               Action
                | $action\_data(t, a, x)$   Action data

*Figure 6*

```
1  header_type _p4v_zombie_t {
2    fields {
3      hit : 1;
4      action : 3;
5      reads_0 : 1;
6      reads_1 : 1;
7    }
8  }
9  metadata _p4v_zombie_t _p4v_zombie;
10 ...
11 action decap_nop() {
12   modify_field(_p4v_zombie._hit, 1);
13   modify_field(_p4v_zombie._reads_0, valid(vlan[0]));
14   modify_field(_p4v_zombie._reads_1, valid(vlan[1]));
15   modify_field(_p4v_zombie._action, 1);
16 }
```

*Figure 7*

$$\begin{aligned}
wlp(x := e, Q) &\triangleq Q[e/x] \\
wlp(c_1;\ c_2, Q) &\triangleq wlp(c_2, wlp(c_1, Q)) \\
wlp(c_1\ []\ c_2, Q) &\triangleq wlp(c_1, Q) \wedge wlp(c_2, Q) \\
wlp(assume(P), Q) &\triangleq P \Rightarrow Q \\
wlp(assert(P), Q) &\triangleq P \wedge Q
\end{aligned}$$

*Figure 9*

DATA PLANE PROGRAM VERIFICATION

CROSS-REFERENCE TO RELATED APPLICATIONS

This application is a continuation of U.S. patent application Ser. No. 16/022,601, filed Jun. 28, 2018, which claims the benefit of U.S. Provisional Patent Application No. 62/663,141, filed Apr. 26, 2018 and U.S. Provisional Patent Application No. 62/571,121, filed Oct. 11, 2017. The entire specifications of which are hereby incorporated herein by reference in their entirety.

BACKGROUND

Recent progress in the formal methods community has dramatically lowered the cost of verification. Researchers in other areas have demonstrated that it is possible to verify complex software systems including compilers, operating systems, databases, distributed protocols, etc. A number of network verification tools have been built in recent years that provide a way to automatically verify data plane and control plane algorithms with respect to formal correctness specifications. Logic is highly effective for modeling and reasoning about networks—the classic techniques that were originally developed in the context of general-purpose programming languages over 50 years ago can be readily applied to networks.

Current tools are based on partial or idealized models of the network and only a few tools handle stateful devices such as load balancers or firewalls. In practice, it is difficult to integrate multiple tools to verify cross-layer properties, or to extend them with new functionality. Furthermore, while existing tools tend to focus more on short-term goals such as identifying bugs in existing networks, fundamentally changing the way that networks are built has the potential for greater long-term impact, such as methodologies for building networks that are guaranteed to satisfy end-to-end performance, reliability, and security properties or even to take a high-level description of the intended network behavior and systematically map it down to an efficient implementation, proving at each step that the generated program faithfully realizes the semantics of the original description.

BRIEF SUMMARY

A method for verifying data plane programs is provided in some embodiments. Because the behavior of a data plane program (e.g., a program written in the P4 language (a domain-specific language for programming data planes)) is determined in part by the control plane populating match-action tables with specific forwarding rules, in some embodiments, programmers are provided with a way to document assumptions about the control plane using annotations (e.g., in the form of "assertions" or "assumptions" about the state based on the unknown control plane contribution). In some embodiments, these "assertions" and "assumptions" about the state of the program or a variable are added by programmers as annotations. In some embodiments, annotations are added automatically to verify common properties, including checking that every header read or written is valid, that every expression has a well-defined value, and that all standard metadata is manipulated correctly. In some embodiments, control plane invariants are synthesized automatically.

The method in some embodiments translates programs from a first language (e.g., P4) to a second language (e.g., Guarded Command Language (GCL)). The translation in some embodiments allocates state for each header and metadata in the program written in the first language and then translates each element (e.g., in P4 each parser, action, and control) into a top-level procedure. Table applications are translated into a non-deterministic choice between actions declared for the table in some embodiments. A "no-op" action is added to the actions declared in the table in some embodiments to indicate the possibility of a miss in the table. In some embodiments, types are assigned to each expression and each expression is cast into the appropriate type (e.g., converting between Boolean values and bit values, adjusting widths, adjusting signs, etc.)

Additional state information is introduced in some embodiments to record the sequence of match-action tables used to process the packet. These traces enable formulating assumptions about the control plane when reasoning about data plane behaviors. In some embodiments, this extra "zombie" state, captures behaviors that are managed by the control plane (i.e., the "brains" of the network. An important property of zombie state is that in some embodiments it is only relevant to verification and is completely independent of the genuine state of the program. Hence, it can be safely erased without changing the packet-processing behavior of the program.

To instrument a program with zombie state, some embodiments define a new metadata instance to record traces, with fields for each table in the program, and add extra statements at the start of each action to record the table and action that were executed as well as the data read in the match key. Because actions may be invoked from multiple tables, some embodiments specialize each action to a particular table. Some embodiments rewrite predicates such as "hit(t)" and "action(t)=a" into equivalent predicates formulated in terms of zombie state.

After translating the program into the second language, a predicate that captures the weakest constraints on the initial state to ensure that no assertion will fail is computed in some embodiments. Once the weakest constraint predicate (e.g., a weakest liberal precondition) is computed it can be checked using a satisfiability modulo theory (SMT) solver.

For longer programs some embodiments employ additional optimizations before computing the weakest precondition. In some embodiments, constant folding, and dead code elimination are used to streamline the translated code. Additionally, some embodiments remove code relating to the zombie state for programs that do not require control-plane assumptions. Memorization is used in some embodiments to reduce the blowup produced by naïve inlining in which all procedure calls are replaced by the code for that procedure. In some embodiments, memorization exploits the fact that certain procedures are performed in particular orders (e.g., a P4 program for a switch executes a parser, followed by an ingress pipeline, followed by an egress pipeline) and verifies the later stages first and memorizes the earlier verification results to avoid redundant verification of the later stages along every branch of an earlier stage (e.g., avoiding evaluating the ingress pipeline for each of a number of different types of headers that can be parsed for which a parser calls the ingress pipeline).

The algorithm for computing the weakest pre-conditions (predicate) in some embodiments is exponential in the size of the program in the worst case. The blowup results from the cases for assignment, which substitutes an expression for each copy of a variable in the predicate, and for choice, which contains two copies of the post-condition. In some embodiments, an alternative algorithm is used that generates predicates that are only quadratic in the size of the program. The algorithm converts programs into "passive form" (which is similar to single-static assignment) where every assignment is replaced with an assumption about the state of the program at that point.

In addition to using the method to verify single programs, some embodiments provide a method to test the equivalence of two programs. In some embodiments, the programs are compared based on weakest pre-conditions of individual procedures. Weakest pre-conditions for procedures at certain levels of the program (e.g., only a top level and a first nested level of procedures) are compared in some embodiments.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF FIGURES

FIGS. 3A-B give an example P4 program that is used as a running example to illustrate the main features of the language.

FIG. 4 defines a set of annotations for the running example P4 program that are sufficient to make verification succeed.

FIG. 5 illustrates an example of Guarded Command Language (GCL), an imperative language with non-deterministic choice.

FIG. 6 defines syntax for the additional expressions that can be used in control-plane assumptions.

FIG. 7 shows the declaration of the zombie metadata and the instrumented version of the nop action in the running example P4 program.

FIG. 9 gives the formal definition of the predicate transformer semantics for GCL, which is also sometimes called weakest preconditions.

DETAILED DESCRIPTION

Figure 1:
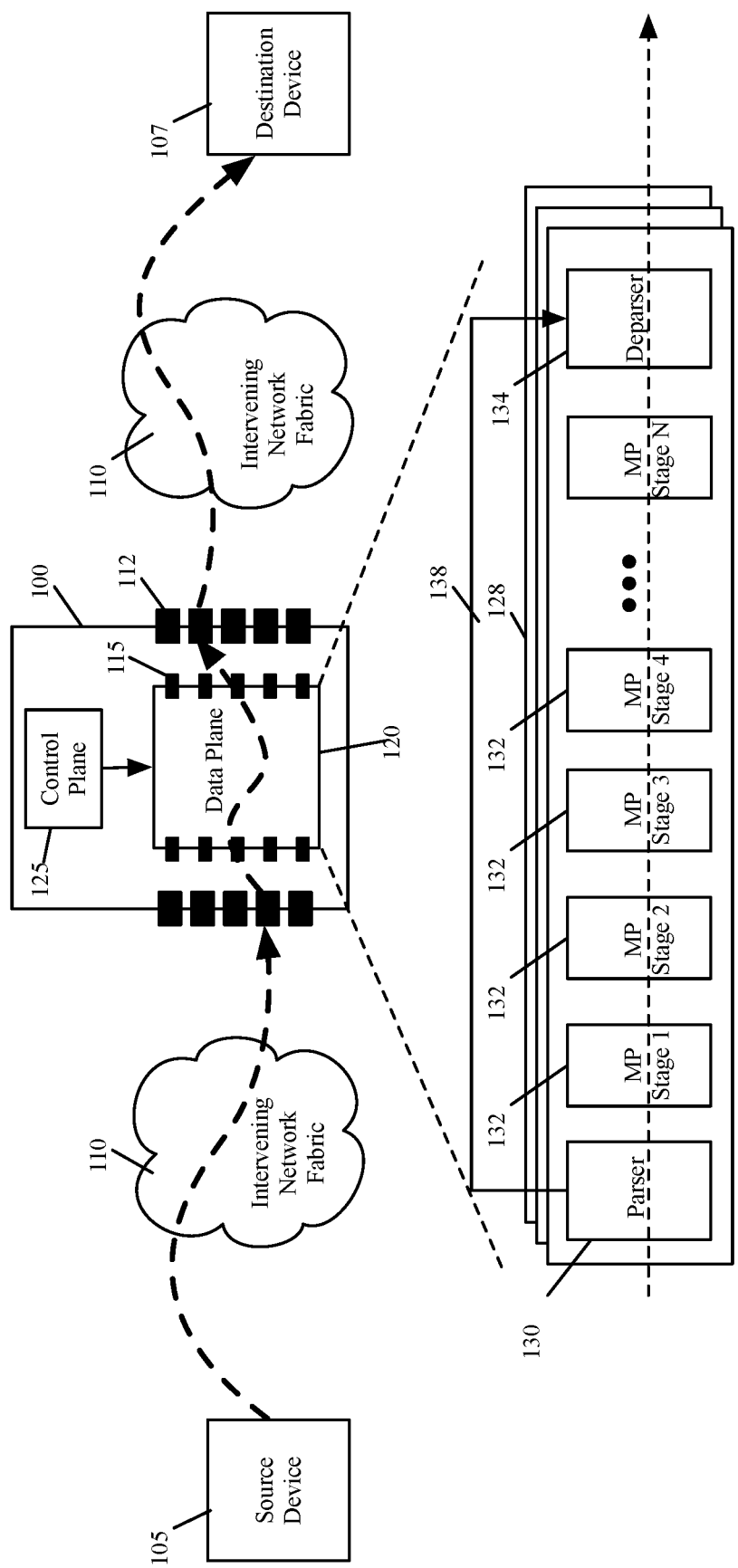
FIG. 1 illustrates a programmable network forwarding element for which programs are written that can be verified using some embodiments.

FIG. 1 illustrates a programmable network forwarding element that executes programs verified some embodiments of the invention. FIG. 1 illustrates an example of a forwarding element 100 with a programmable/configurable data plane circuit 120. The forwarding element 100 forwards data messages within a network 110 based on a program provided by a user, in some embodiments. The program, in some embodiments, includes instructions for forwarding data messages, as well as performing other processes such as firewall, denial of service attack protection, and load balancing operations. The forwarding element 100 can be any type of forwarding element, such as a switch, a router, a bridge, etc.

In FIG. 1, the forwarding element is deployed as a non-edge forwarding element in the interior of the network to forward data messages from a source device 105 to a destination device 107. In other cases, this element 100 is deployed as an edge forwarding element at the edge of the network to connect to compute devices (e.g., standalone or host computers) that serve as sources and destinations of the data messages. As a non-edge forwarding element, the forwarding element 100 forwards data messages between forwarding elements in the network (i.e., through intervening network fabric 110), while as an edge forwarding element, the forwarding element forwards data messages to and from edge compute devices to each other, to other edge forwarding elements and/or to non-edge forwarding elements.

As shown, the forwarding element 100 includes (1) a data plane circuit 120 (the "data plane") that performs the forwarding operations (executes the program) of the forwarding element 100 to forward data messages received by the forwarding element to other devices, and (2) a control plane circuit 125 (the "control plane") that configures the data plane circuit. The forwarding element 100 also includes physical ports 112 that receive data messages from, and transmit data messages to, devices outside of the forwarding element 100. The data plane circuit 120 includes ports 115 that receive data messages to process and to transmit data messages after they have been processed. Some ports 115 of the data plane 120 are associated with the physical ports 112 of the forwarding element 100, while other ports 115 are associated with other modules of the data plane 120.

The data plane includes several configurable (i.e., programmable) message-processing stages 132 that can be configured to perform the data-plane forwarding operations of the forwarding element 100 to process and forward data messages to their destinations. These message-processing stages perform these forwarding operations by processing data tuples (e.g., message headers) associated with data messages received by the data plane 120 in order to determine how to forward the messages. The message-processing stages in some embodiments include match-action units (MAUs) that try to match data tuples (e.g., header vectors) of messages with table records that specify action to perform on the data tuples. In some embodiments, table records are populated by the control circuit 125 and are not known when configuring the data plane to execute a program provided by a network user.

The configurable message-processing circuits 132 are grouped into multiple message-processing pipelines 128. The message-processing pipelines can be ingress or egress pipelines before or after the forwarding element's traffic management stage that serves as a crossbar switch that directs messages from the ingress pipelines to egress pipelines.

Each pipeline includes a parser 130, several message-processing stages 132, and a deparser 134. A pipeline's parser 130 extracts a message header from a data message that the pipeline receives for processing. In some embodiments, the extracted header is in a format of a header vector (HV) that is processed, and in some cases modified, by successive message processing stages 132 as part of their message processing operations. The parser 130 of a pipeline passes the payload of the message to the deparser 134 as the pipeline's message-processing stages 132 operate on the header vectors. In some embodiments, the parser also passes the message header to the deparser 134 along with the payload (i.e., the parser passes the entire message to the deparser).

When a pipeline 128 finishes processing a data message and the message has to be provided to the traffic management stage (in case of an ingress pipeline) or to a port 115 (in case of an egress pipeline) to be forwarded to the message's next hop (e.g., to its destination compute node or next forwarding element), a deparser of the pipeline in some embodiments produces the data message header from the message's header vector that was processed by the pipeline's last message processing stage, and combines this header with the data message's payload. In some embodiments, the deparser 134 uses part of the header received from the parser 130 to reconstitute the message from its associated header vector.

Figure 2:
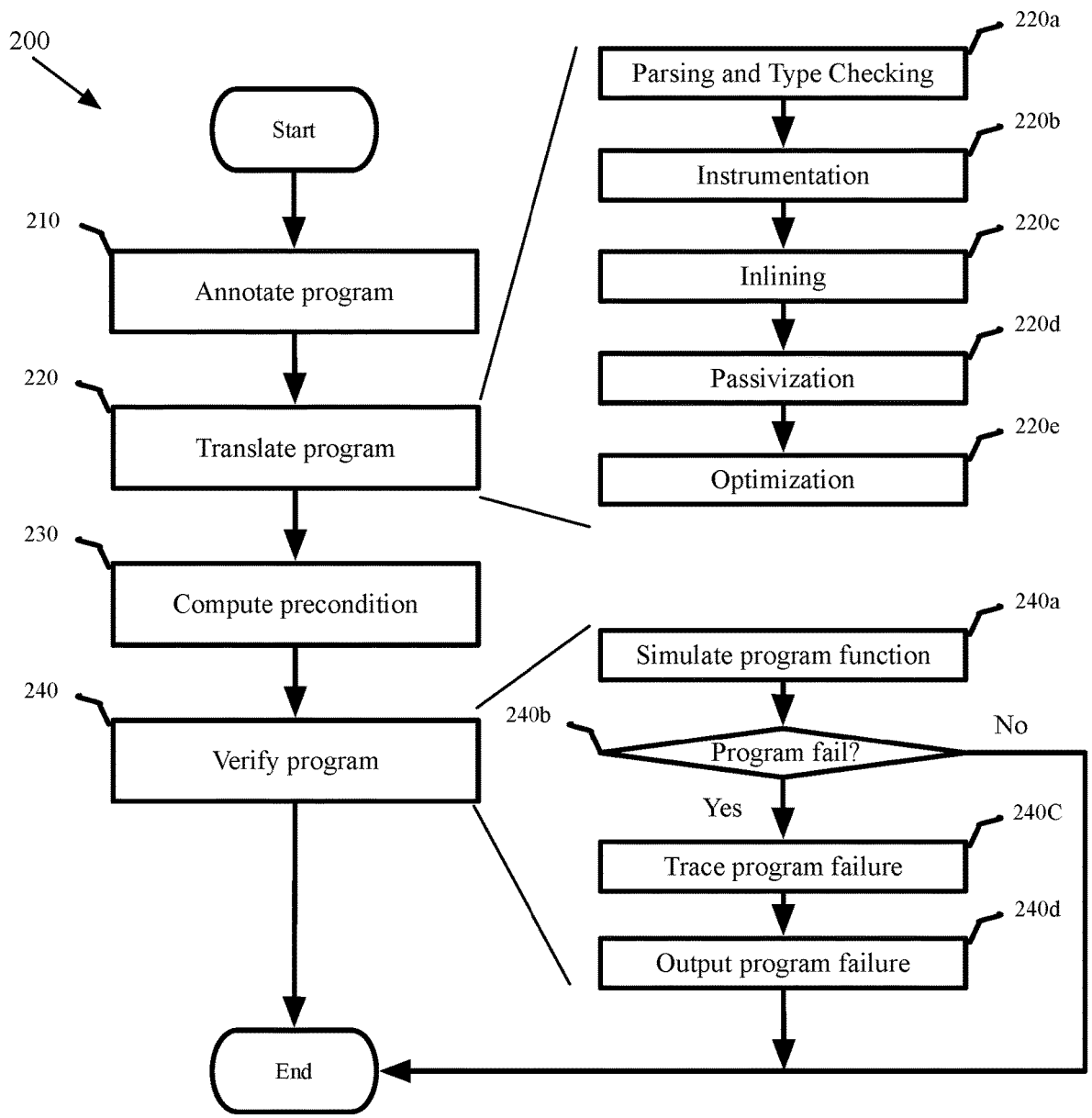
FIG. 2 illustrates a process for verifying a program in some embodiments.

FIG. 2 illustrates process 200 that is used in some embodiments to verify program (e.g., a program written in the P4 language) to be executed by a data plane (e.g., after being configured by a control plane). FIGS. 3, 4, and 7 provide a simple exemplary program written in the P4 language and additional elements used to implement the process 200 in some embodiments. Process 200 begins (at 210) by annotating a program (e.g., the program illustrated in FIG. 3). In some embodiments, because the behavior of a data plane program (e.g., a program written in the P4 language) is determined in part by the control plane populating match-action tables with specific forwarding rules, programmers are provided with a way to document assumptions about the control plane using annotations (e.g., in the form of "assertions" or "assumptions" about the state based on the unknown control plane contribution). In some embodiments, these "assertions" and "assumptions" about the state of the program or a variable are added by programmers as annotations. In some embodiments, annotations are added automatically to verify common properties, including checking that every header read or written is valid, that every expression has a well-defined value, and that all standard metadata is manipulated correctly. In some embodiments, control plane invariants are synthesized automatically.

FIGS. 3A-B gives an example P4 program that illustrates aspects of the invention. P4 is a declarative language for programming network data planes organized around a small number of domain-specific abstractions: headers, parsers, tables, actions, controls, etc. The example P4 program presented in FIGS. 3A-B implements the logic for decapsulating virtual local area network (VLAN) tags at the last hop and was lifted from "switch.p4," a program that implements all of the functionality found on a conventional fixed-function device in P4, including Ethernet switching, IP routing, access control, tunneling, etc.

FIG. 3A illustrates the beginning of a program. The first few lines of the program define types 305 for the headers used in this program (lines 1-15), and declare instances 310 of those types (lines 16-17): one Ethernet header and a stack of up to two VLAN headers. Each header instance 310 is initially invalid, but can be made valid by the parser 315, which executes a simple finite state machine to extracts bits from the packet and copy them into the corresponding header instances (lines 18-36) (e.g., each state may extract bits out of a packet header and copy them into an instance before transitioning to the next state). Instances, in some embodiments, are statically allocated and globally accessible. In addition to the instances explicitly defined by the programmer, there is also, in some embodiments, an implicit instance for standard metadata (e.g. standard_metadata) that keeps track of information such as whether the packet should be dropped, mirrored, or forwarded out a physical port.

FIG. 3B illustrates additional parts of the program. Note that after parsing, one or both of the VLAN instances may be invalid, depending on the value of the Ethernet instance's EtherType field. Next, the packet is processed by ingress control 320 (lines 58-61), which uses the rules in the decap table 325 (line 59) to match the validity bits for the VLAN instances and either apply one of the specified actions 330 (i.e., remove_single tag if the packet has a single VLAN tag, remove_double_tag if the packet has a double VLAN tag, or a no-op if the packet misses). Each action is defined in terms of an imperative block of code that modifies some of the bits in the packet using built-in primitive actions such as "modify_field" and "remove_header." The rules in the table are populated by the control plane, which is independent of the P4 program itself.

There are a number of errors that can arise when executing a data plane program. Some errors are triggered by violations of general safety properties that all data plane programs should satisfy. For example, no program should attempt to read or write an invalid header, which produces an undefined result. Beyond header validity, there are several other basic safety properties that are critical for ensuring that programs have consistent and portable behavior. These properties include ensuring that header stacks are only ever accessed within statically-declared bounds, that arithmetic operations do not overflow, and that the compiler-generated deparser emits all headers that are valid at the end of the egress pipeline. Because these properties can be checked using simple, local, and general tests on program state, in some embodiments, we can automatically annotate programs with appropriate checks, and verify them without requiring program-specific assertions. Other errors are specific to the logic of individual programs. For example, the intention in the code illustrated in FIG. 3 is to remove all VLAN tags. Both kinds of errors can be detected using logical assertions over the state of the program—i.e., the set of header and metadata instances. FIG. 4 illustrates exemplary control plane annotations in the program of FIG. 3.

FIG. 4 illustrates a set of annotations for the exemplary program of FIG. 3 that are sufficient to make verification succeed. These annotations (indicated by "@pragma") state that the control plane must install rules to ensure that every packet hits in the table (line 1) and that the "nop" (lines 2 and 3), "remove_single_tag" (lines 4 and 5), and "remove_double_tag" (lines 6 and 7) are only applied to packets in which the corresponding VLAN instances are valid.

Other programs may define other header types, actions, and tables. For example, a firewall program, in some embodiments further defines an internet protocol (IP) version 4 (IPv4) header type (e.g., ipv4_t). The ipv4_t header is defined, in some embodiments, by the following set of fields: pre_ttl:64, ttl:8, protocol:8, checksum: 16, src_addr: 32, and dst_addr: 32. Additional parser functions are defined for ipv4_t header types (e.g., 0x800: parse_ipv4 (indicating that if a Ethernet type is IPv4, an IPv4 header type should be parsed). A firewall program, in some embodiments, also specifies a unique set of actions (e.g., allow, deny, drop, nop, and rewrite) some of which accept arguments and include further actions (e.g., rewrite accepts as arguments "addr" and "port" which are input as arguments to modify_field actions for ipv4.dst_addr and standard_metadata.egress_spec respectively). A firewall program, in some embodiments, also includes additional tables such as an access control list (ACL) table and a network address translation (NAT) table.

Process 200 translates (at 220) the program (including the annotations) into an imperative language with non-deterministic choice (e.g., Guarded Command Language (GCL)). FIG. 5 illustrates an example of variables, expressions, predicates, and commands in GCL. Assignment substitutes the expression for the variable in the postcondition, while sequential composition threads the postcondition through $c_1$ and $c_2$, and non-deterministic choice computes the conjunction of the weakest preconditions for $c_1$ and $c_2$. For assumptions and assertions, which, in some embodiments, handle annotations provided by a user. Assumptions produce an implication from the formula being assumed to the postcondition, while assertions conjoin the formula to the postcondition. As discussed below in relation to 230 and 240, the weakest precondition for a P4 program is given by wlp(c, true), where c is the translation of the P4 original program into GCL. In some embodiments, the translation handles a full language (e.g., a P4 language including parsers, controls, tables, and actions, as well as parser exceptions, parser value sets, action profiles, checksums, registers, meters, etc.).

In some embodiments, the original language (e.g., P4) lacks a formal semantics such that the language specification is generally well-written, but the precise meaning of a number of constructs is not clear. For example, the P4 language lacks a static type system wherein the meaning of arithmetic expressions such as "x+x" are not always well-defined: depending on the bit width of "x," it might either evaluate to "2x" or to a value less than x if the addition overflows. Worse, if x is a control-plane-supplied action parameter, then its width is arbitrary. Similar issues arise with expressions involving saturated and signed values. Thus, in some embodiments, translation comprises parsing and type checking (at 220a) as a first phase of the translation. In some embodiments, parsing and type checking is performed as a P4v front end operation. Translating the program into the imperative language with non-deterministic choice (e.g., GCL) as above avoids these issues. Additionally, using a translation into the imperative language with non-deterministic choice (e.g., GCL) allows programs in multiple languages to be handled by the same back-end verification code with appropriate coding of the front-end translation code.

FIG. 6 defines syntax for the additional expressions that can be used in control-plane assumptions. The expression reach(t) is set to 1 if the execution reaches an application of t. The expression reads(t, k) is set to the data-plane value read by t identified by k. Similarly, wildcard(t, k) evaluates to 1 if the value identified by k is matched against an all wildcard pattern. The expressions hit(t) and miss(t) evaluate to 1 if executing the table hits and misses respectively. Finally, the expression action_data(t, a, x) returns the value of the action data for parameter x in action a.

Control-plane assumptions, in some embodiments, are formulated as symbolic constraints on the data-plane execution—i.e., there is no need to specify the precise forwarding rules that will be installed at run-time. More complicated assumptions may be written that capture conditions involving multiple tables. For example, any of the following assumption can be formulated (1) that if table t hits, then table u must also hit. (2) that if table t executes action a, then table u will execute actions b or c. Multi-table assumptions are used in verifying properties of certain programs (e.g., in verifying switch.p4 to rule out cases where a packet classified as IPv4 in a table early in the pipeline is processed in a later table using actions for IPv6 packets). Assumptions, in some embodiment, are inserted in a program by a user before translation (at 220) as extra ghost state to keep track of which tables and actions are executed. In some embodiments, the ghost state is translated into assumptions and further assumptions are included as part of an instrumentation operation 220b.

In some embodiments, the translation (at 220) also includes an instrumentation (at 220b) that augments the program with additional "zombie" state information that keeps track of information about the execution of match-action tables and actions at run-time. These traces enable formulating assumptions about the control plane when reasoning about data plane behaviors. In some embodiments, this extra "zombie" state captures behaviors that are managed by the control plane (i.e., the "brains" of the network). An important property of zombie state is that it is only relevant to verification and is completely independent of the genuine state of the program. Hence, it can be safely erased without changing the packet-processing behavior of the program.

FIG. 7 depicts the declaration of zombie metadata and the instrumented version of the "nop" action in reference to the program depicted in FIG. 3. FIG. 7 illustrates the creation of a new header type "_p4v_zombie_t" and the fields of the header type (lines 1-8). A new metadata instance is also defined to record traces, with fields for each table in the program (line 9). Extra statements at the start of an action are also introduced to record the table and action that were executed as well as the data read in the match key (lines 12-15). Because actions may be invoked from multiple tables, some embodiments specialize each action to a particular table. Finally, predicates such as "hit(t)" and "action (t)=a" are rewritten into equivalent predicates formulated in terms of zombie state.

More generally, for a given source program defining an action "a" and table "t":

```
action a(x) {
    modify_field(m.g, x);
}
table t {
    reads { m.f:exact; }
    actions { a;a}
}
apply (t);
``` the P4v front-end generates the following instrumented program:

```
_p4v_zombie.reach_t := 1;
_p4v_zombie.reads_t := m.f;
{ /* Code for miss */
    _p4v_zombie.hit_t := 0; }
[ ]
{ /* Code for hit with action a */
    _p4v_zombie.hit_t := 1;
    __p4v__a_t_x := <?>;
    _p4v_zombie.action_t := 1;
    m.g := __p4v__a_t_x }
```

Here, the <?> expression denotes an arbitrary "havoc" value, reflecting the fact that the action data supplied by the control plane is unknown. In some embodiments, assumptions are generated as part of the translation/instrumentation (at 220*b*). For example, the translation may include generating an assertion annotating each field read and field write, asserting that the field belongs to a header instance that is valid at the point of access. For example, the following annotation for a validate_mpls_packet table in a switch program (e.g. switch.p4) states that one of the actions should only be taken when the mpls[0] instance is valid:

```
assume
    action(validate_mpls_packet) == set_valid_mpls_label1
    implies
        reads(validate_mpls_packet, mpls[0]) == 1
```

Although P4 parsers may contain loops, some embodiments follow the P4 reference implementation and unroll loops and use a simple analysis to detect unproductive cycles that do not extract any bits from the packet. Because table rules are populated by the control plane, in some embodiments each table application is translated into a non-deterministic choice between the actions declared for the table and a special "no-op" to handle the case where the packet misses in the table (unless the table declares a default action, in which case it never misses). For example, the statement "apply(decap)" from the example code depicted in FIG. 3 is translated into the following code: assume (true), decap_nop ( ) decap_remove_single_tag ( ) decap_remove_double_tag ( ). The statement "assume true" encodes the "no-op" operation for the case where the table misses. Finally, some embodiments use Hindley-Milner type inference to assign types to each expression, inserting casts to convert between Boolean values and bit values and adjust widths and signs as appropriate. Similarly, the translation of the ACL table in the firewall program discussed above is the following GCL code: assume (true), allow( ), deny( ).

Translating (at 220) the program in some embodiments includes inlining (at 220*c*) to eliminate procedure calls and generate a single piece of GCL code that fully captures the semantics of the original P4 source program. The primary reason for inlining is to enable other optimizations and simplify verification condition generation. However, inlining naively can lead to dramatic size increases, since it replaces each procedure call with the entire body of that procedure. Fortunately, by taking advantage of the domain-specific structure of P4 programs, we can avoid this blowup in some important cases. For example, consider a parser that handles Ethernet, IPv4, and TCP:

```
parser start {
    extract(ethernet);
    return select(ethernet.etherType) {
        0 x 800 : parse_ipv4;
        default: ingress;
    }
}
parser parse_ipv4 {
    extract(ipv4);
    return select(ipv4.protocol) {
        0 x 6 : parse_tcp;
        default: ingress;
    }
}
parser parse_tcp {
    extract(tcp) ;
    return ingress;
}
``` a naive inlining of the calls to ingress, will end up with three identical copies of the code for the rest of the program. However, because the last statement in every parser is a transition to another state (or an error handler), a single copy of the code for ingress is placed at the end of the start state, in some embodiments, and other paths through the parser simply "fall through" to that code. In practice, this optimization of the inlining significantly improves performance, especially for programs that parse complex packet formats.

In some embodiments, inlining (at 220*c*) includes weaving the control-plane assumptions into the rest of the program. To overcome the mismatch between the control-plane's global perspective, and data-plane's local perspective in p4v (e.g., control-plane assumptions that span multiple tables) control-plane assumptions, in some embodiments, are woven into every assertion in the program. For example, if A is the control-plane assumption, then the translation maps ever occurrence of an assertion assert(P) to assert(A⇒P). The effect of this translation is to treat control-plane assumptions as being in force at every program location. In embodiments weaving control-plane assumption into every assertion, instead of writing assumptions that are only valid at particular locations, assumptions that are locally valid should be predicated on reaching the location. For example, using the existing annotation language and ghost state, a local assumption that action(t)=a is predicated on the assumption reach(t).

In some embodiments, inlining (at 220*c*) includes memorization, Memorization is used in some embodiments in verifying loop-free programs to reduce the blowup produced by naïve inlining in which all procedure calls are replaced by the code for that procedure. In some embodiments, memorization exploits the fact that certain procedures are performed in particular orders (e.g., a P4 program for a switch executes a parser, followed by an ingress pipeline, followed by an egress pipeline) and verifies the later stages first and memorizes the earlier verification results to avoid redundant verification of the later stages along every branch of an earlier stage (e.g., avoiding evaluating the ingress pipeline for each of a number of different types of headers that can be parsed for which a parser calls the ingress pipeline).

Figure 8:
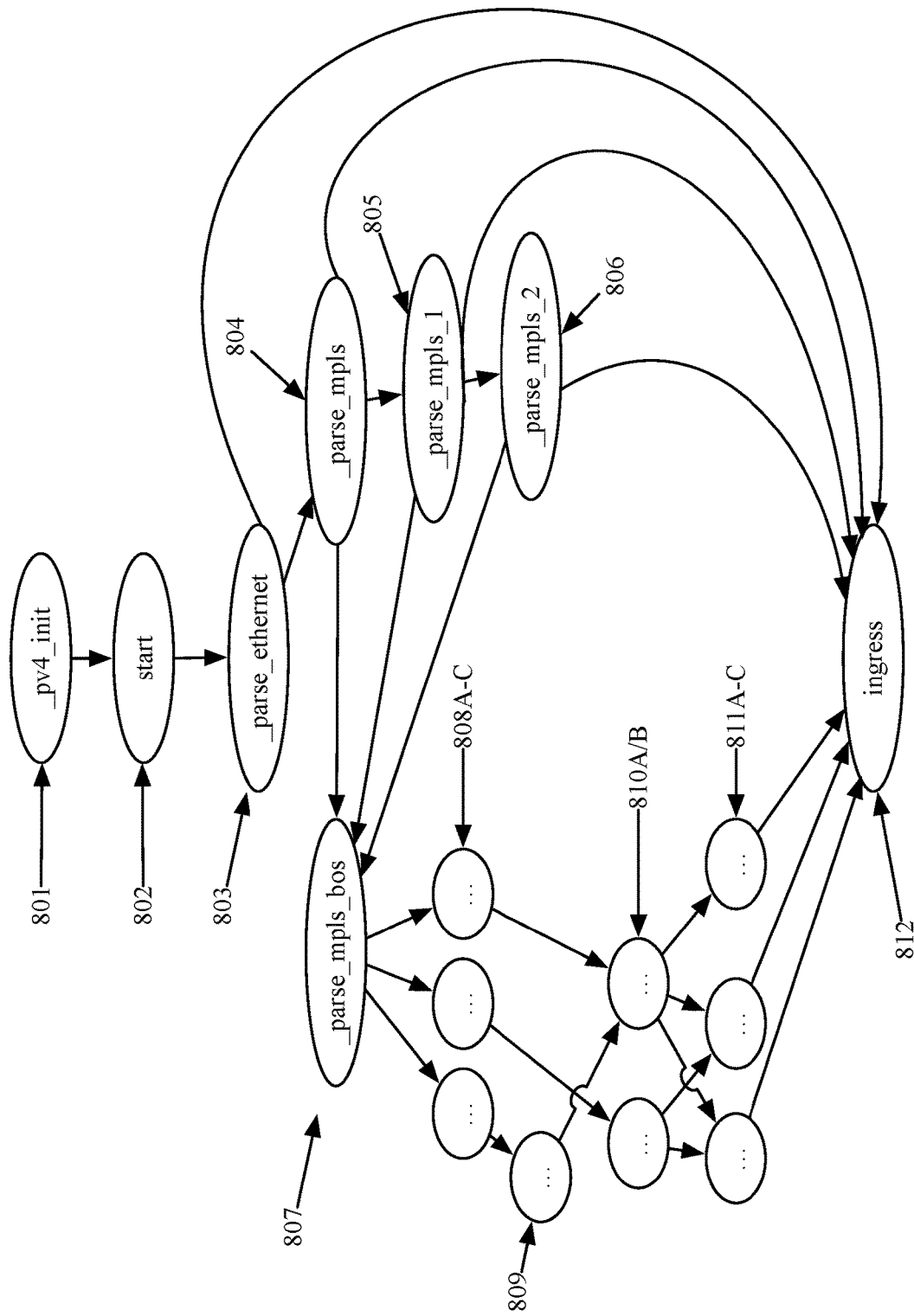
FIG. 8 provides a graphic depiction of a multiplicity of procedure calls for an exemplary P4 switch program that all end up calling a single ingress pipeline.

FIG. 8 provides a graphic depiction of a multiplicity of procedure calls 801-811 for an exemplary P4 switch program that all end up calling a single ingress pipeline. FIG. 8 illustrates a series of procedures that may be traversed between an initiation (_pv4_init 801) and the beginning of an ingress pipeline 812. Certain procedures have names to indicate a function (801 to 807 and 812) while others have been left blank (808A-C to 811A-C) and are shown to highlight the point that there are many paths between 801 and 812. Each arrow represents a procedure call that may be made as part of the procedure from which the arrow originates. For example, "_parse_ethernet" 803 may call either "_parse_mpls" 804 or the ingress pipeline 812. Procedure "_parse_mpls" 804 may in turn call any of procedures 805, 807, or 812. The permutations of different procedure calls each need to be verified to ensure that the program functions properly. If, for example, the program was to be verified without memorization of the ingress pipeline, the verification of each different path would require verifying the ingress pipeline as part of that path. Memorization allows the ingress pipeline to be verified once and the verification results can be used in verifying each path.

To avoid exponential growth of verification conditions, translating (at 220) the program further includes passivization (at 220*d*). Exponential blowup, in some embodiments, results from the cases for assignment, which substitutes an expression for each copy of a variable in the predicate, and for choice, which contains two copies of the postcondition. Passivation converts programs into "passive form" (which is similar to single-static assignment) where every assignment is replaced with an assumption about the state of the program at that point. Such passivation, in some embodiments, results in predicates that only grow quadratically with the size of the program.

Translating (at 220) the program includes, in some embodiments, an optimization (at 220*e*). In some embodiments, constant folding, constant propagation, and dead code elimination are used to streamline the translated code. Additionally, some embodiments remove translated code relating to the zombie state for programs that do not require control-plane assumptions.

After translating the program into the second language, the process computes (at 230) a precondition (e.g., a set of verification conditions, or a predicate) that captures constraints on the initial state to ensure that no assertion will fail. Computing the precondition, in some embodiments, includes producing a single logical formula that can be handed off to a satisfiability modulo theory (SMT) solver. In some embodiments, the predicate is the predicate that places the weakest constraints on the initial state to ensure that no assertion will fail (e.g., a weakest liberal precondition). A precondition in some embodiments expresses the conditions that must hold before a program is run in order to satisfy the final conditions (e.g., that that no assertion will fail). Once a precondition (e.g., the weakest constraint predicate) is computed, it can be checked using an SMT solver.

FIG. 9 gives the formal definition of the predicate transformer semantics for GCL, which is also sometimes called weakest preconditions. Most cases are intuitive—e.g., sequential composition threads the postcondition Q through c1 and c2 while non-deterministic choice requires the conjunction of the preconditions for c1 and c2. The weakest precondition for a P4 program is given by wlp(c, true), where c is the translation of the original program.

Once a suitable precondition or logical formula is computed or produced, the process verifies (at 240) the satisfiability of the precondition or formula. In some embodiments, verifying (at 240) the satisfiability of the program (or precondition) includes simulating (at 240*a*) a program function (e.g., assuming some precondition is true and running through the program logic to determine if any logical statements (i.e., translations of the original program including assertions and assumptions) evaluate to false.

If the process determines (at 240*b*) that a logical assumption is false, the SMT solver traces (at 240*c*) the program failure to determine the initial condition (e.g., an assertion or assumption) that causes the failure and then traces the initial condition forward to determine the path (e.g. function calls, table reads, actions, etc.) that caused the assumption to fail. In some embodiments, the trace is based on the annotations (e.g., zombie state, assumptions, and assertions) included in the program to be verified by the translation (at 220). The process then outputs (at 240*d*) the trace of the failed assumption on a user interface for a user to identify and correct problematic aspects of the original program.

In some embodiments, the process verifies (at 240) whether the negation of the formula is satisfiable. If the negation of the formula is not satisfiable, then the program is guaranteed to be correct, because the weakest preconditions are valid. On the other hand, if the negation of the formula is satisfiable, then the SMT solver (e.g., Z3) can compute a model that provides a counter-example to the property being checked.

In the case where the negation is satisfiable, the verification (at 240) converts the model produced by the SMT solver (e.g. Z3) back into a human-readable trace. Some embodiments use a depth-first search on the program to find some assertion whose formula evaluates to false in the model, and then traces steps backwards to populate the rest of the trace. In some embodiments, the SMT solver reports the initial value of the packet headers, and the sequences parser states and match-action tables executed to reach the failed assertion. An example of a trace constructed using p4v, in some embodiments, looks like:

[Result] Failed
[Counterexample]
[Parser] start
[Parser] _parse_ethernet
[Packet] ethernet.dstAddr=0x000000000000
[Packet] ethernet.srcAddr=0x000000000000
[Packet] ethernet.etherType=0xf7ff
[Assert] (not (=ipv4.valid 1w0))

In addition to using the method to verify single programs, some embodiments provide a method to test the equivalence of two programs. In some embodiments, computed preconditions for the two programs are compared to evaluate whether the programs are equivalent. In some embodiments, programs are evaluated for equivalence based on preconditions computed for constituent parts of the programs. In some embodiments, procedures at certain levels of the program (e.g., only a top level and a first nested level of procedures) are compared in some embodiments. In some embodiments, the compared preconditions are a set of weakest liberal preconditions.

Figure 10:
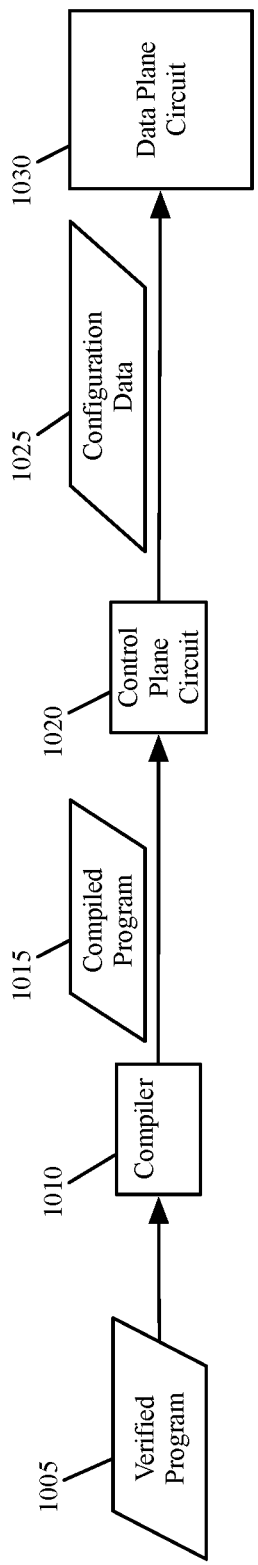
FIG. 10 illustrates an embodiment in which a verified program is provided to a compiler that compiles the program and sends the compiled program to a control plane circuit.

FIG. 10 illustrates a verified program 1005 (e.g., a forwarding-element program that specifies desired behaviors of a forwarding element for forwarding a data message that has been verified by process 200) that, in some embodiments, is provided to compiler 1010 that compiles the program and sends the compiled program 1015 to control plane circuit 1020. Control plane circuit 1020 converts the compiled program 1015 into configuration data 1025 that is used to configure the data plane circuit 1030 to execute the program. In some embodiments, the configuration data is a set of instructions that configures the data plane circuit 1030 to implement the forwarding behaviors specified by verified program 1005. In some embodiments, the compiler is executed by the forwarding element (e.g., forwarding element 100) that includes control plane circuit 1020 and data plane circuit 1030. In other embodiments, the compiler executes on a separate device and the compiled program is provided to the forwarding element.

A further example of the use of the P4 verification is to verify whether tables depend on each other (e.g., modify a same field) and must be placed in different pipeline stages. In some programmable forwarding elements (e.g., switches, routers, bridges, etc.) such as a Tofino programmable Ethernet switch built using a protocol independent switch architecture (PISA), there are a limited number of stages across which tables are implemented. Thus, for a PISA architecture, efficiently assigning logical P4 tables to a limited number of physical stages is a critical job of P4 compilers. Table assignment needs to maximize pipeline concurrency, which allows multiple tables to be placed in the same pipeline stage, while also respecting control and data dependencies between tables.

A data dependency exists between two tables if one matches a field that the other writes, and both are on the same control flow path. Two tables can be placed on the same pipeline stage if and only if they do not have a dependency relationship. An example of tables that appear to have a dependency are the "mirror" table for handling packet copies cloned by mirroring engine and a "rid" table for handling packet replicas generated by a multicast engine. They both have an action that modifies a user-defined metadata field carrying layer-2 bridge domain ("egress_ metadata_bd") as shown in the following code:

```
action set_mirror_bd(bd) {
  modify_field(egress_metadata.bd, bd);
}
table mirror {
  reads { i2e_metadata.mirror_session_id : exact; }
  actions {
    nop;
    set_mi rror_nhop;
      set_mi rror_bd ;
  }
}
action outer_replica_from_rid (bd, . . . ) {
  modify_field(egress_metadata.bd, bd); . . .
}
action inner_replica_from_rid (bd, . . . ) {
  modify_field(egress_metadata.bd, bd); . . .
}
table rid {
  reads { intrinsic_metadata.egress_rid: exact; }
  actions {
    nop;
    outer_replica_from_rid;
    inner_replica_from_rid;
  }
}
```

A common field cannot be modified concurrently by multiple tables in one stage. In some embodiments, a table definition in p4 enumerates all possible match fields and actions that a control plane may use to form match-action entries in runtime. At the time of program compilation, the compiler does not know how control plane will actually form the match-action entries. Thus, it analyzes table dependencies in a conservative manner by assuming each table will exercise all possible actions. Hence an action dependency (two conflicting actions on the same field) is deemed between the mirror and rid tables and they are allocated in two different stages.

However, using the P4 verification allows a compiler confirm that the tables do not conflict and can be placed in a same stage. For example, consider how the two tables (mirror and rid) are used by mirroring and multicast, mirror handles packet copies cloned by mirroring engine; it matches on mirror session ID and sets either next hop (in case of L3 traffic) or bridge domain (in case of L2 traffic), rid handles packet replicas generated by multicast engine; it matches on egress.rid (replication ID) and sets bridge domain and other tunnel information accordingly. Certain PISA architectures allow a data packet to be mirrored and replicated at the same time; such mirrored and replicated copies can hit both mirror and rid tables. Assuming the network operator intends to apply the mirror and multicast combo only to L3 traffic, the mirror table should not take set_mirror_bd action for such L3 packets. If the mirror table does not take a set_mirror_bd action, then the two tables do not take conflicting actions anymore and can be placed concurrently in the same stage.

A set of ghost variables is defined, in some embodiments, to keep track of the value of egress_rid ('R') and mirror_ session_id ('M') and can be used to express the assumptions about the control plane as in the following code added before applying the tables:

```
@pragma assume \
  intrinsic_metadata.egress_rid == R and \
  i2e_metadata.mirror_session_id == M
```

The previous lines of code indicate that egress_rid and mirror_session_id are given (by a multicast engine or when a packet is cloned) prior to the application of the tables. After applying the tables, the following code is introduced to implement the control-plane assumptions:

```
@pragma assume \
  (R != 0 and \
    reads(mirror , i2e_metadata.mirror.session_id) == M) implies
  \ not(action(mirror) == set.mirror.bd)
@pragma assert \
  not((  action(rid) == inner_replica_from.rid or \
  action(rid) == outer_replica_from.rid) and \
  action(mirror) == set.mirror.bd)
```

The first condition "R!=0" checks if the packet is replicated since replicated packets have non-zero egress.rid in this case. The next condition, "reads(mirror, i2e_metadata. mirror_session_id)==M" checks if mirror table hits an entry that matches mirror_session_id M for the current packet. Under the two conditions, the packet is mirrored as well as replicated, hence it must be a L3 packet, and the action taken by mirror table cannot be set_mirror_bd. Finally, the assert statement ensures that at most one of the two tables will exercise an action that modifies the common field. Note that the use of ghost variables makes it easier to see that conditions involving these values (vs. the metadata itself, which might be modified in between where the program reads its value and where the program make an assertion on it) are what the control-plane enforces. The control-plane can enforce these assumptions in various ways based on its implementation. For example, when the mirror table is programmed for mirror session M, it can cross-check with mirror configuration database to see if multicast is applied to the mirror session, if so, it can prohibit the mirror_set_bd action in the entry matching on session M.

Figure 11:
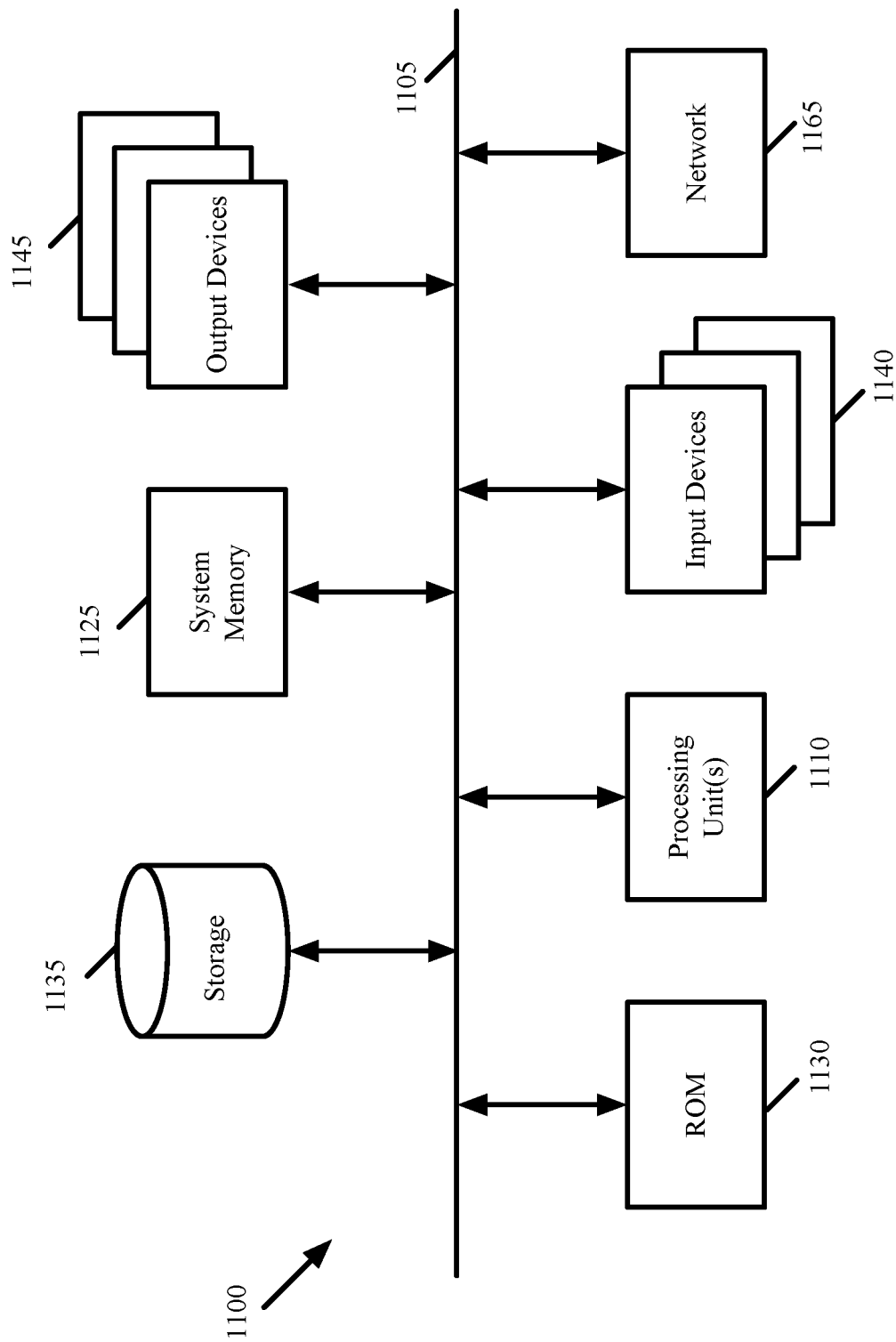
FIG. 11 conceptually illustrates an electronic system with which some embodiments of the invention are implemented.

FIG. 11 conceptually illustrates an electronic system 1100 with which some embodiments of the invention are implemented. The electronic system 1100 may be a computer (e.g., a desktop computer, personal computer, tablet computer, server computer, mainframe, a blade computer etc.), or any other sort of electronic device. The electronic system 1100 can also implement the control plane modules of some embodiments. As shown, the electronic system includes various types of computer readable media and interfaces for various other types of computer readable media. Specifically, the electronic system 1100 includes a bus 1105, processing unit(s) 1110, a system memory 1125, a read-only memory 1130, a permanent storage device 1135, input devices 1140, and output devices 1145.

The bus 1105 collectively represents all system, peripheral, and chipset buses that communicatively connect the numerous internal devices of the electronic system 1100. For instance, the bus 1105 communicatively connects the processing unit(s) 1110 with the read-only memory 1130, the system memory 1125, and the permanent storage device 1135. From these various memory units, the processing unit(s) 1110 retrieve instructions to execute and data to process in order to execute the processes of the invention. The processing unit(s) may be a single processor or a multi-core processor in different embodiments.

The read-only-memory (ROM) 1130 stores static data and instructions that are needed by the processing unit(s) 1110 and other modules of the electronic system. The permanent storage device 1135, on the other hand, is a read-and-write memory device. This device is a non-volatile memory unit that stores instructions and data even when the electronic system 1100 is off. Some embodiments of the invention use a mass-storage device (such as a magnetic or optical disk and its corresponding disk drive) as the permanent storage device 1135.

Other embodiments use a removable storage device (such as a floppy disk, flash drive, etc.) as the permanent storage device. Like the permanent storage device 1135, the system memory 1125 is a read-and-write memory device. However, unlike storage device 1135, the system memory is a volatile read-and-write memory, such a random access memory. The system memory stores some of the instructions and data that the processor needs at runtime. In some embodiments, the invention's processes are stored in the system memory 1125, the permanent storage device 1135, and/or the read-only memory 1130. From these various memory units, the processing unit(s) 1110 retrieve instructions to execute and data to process in order to execute the processes of some embodiments.

The bus 1105 also connects to the input and output devices 1140 and 1145. The input devices enable the user to communicate information and select commands to the electronic system. The input devices 1140 include alphanumeric keyboards and pointing devices (also called "cursor control devices"). The output devices 1145 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 11, bus 1105 also couples electronic system 1100 to a network 1165 through a network adapter (not shown). In this manner, the computer can be a part of a network of computers (such as a local area network ("LAN"), a wide area network ("WAN"), or an Intranet, or a network of networks, such as the Internet. Any or all components of electronic system 1100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, FIG. 2 conceptually illustrate a process. The specific operations of this process may not be performed in the exact order shown and described. The specific operations may not be performed in one continuous series of operations, and different specific operations may be performed in different embodiments. Furthermore, the process could be implemented using several sub-processes, or as part of a larger macro process.

Also, in the embodiments described above, the data plane operators collect and report both path and hop latency values to the control plane processes. In other embodiments, these data plane operators only collect path data or hop latency values, and report one such set of values to the control plane processes. In still other embodiments, these data plane operators collect other tracking data for each forwarding element along the path. One example of such other data is queue depth at each forwarding element along the path. Therefore, one of ordinary skill in the art would understand that the invention is not to be limited by the foregoing illustrative details, but rather is to be defined by the appended claims.

What is claimed is:

1. A non-transitory machine-readable medium storing a verification program for execution by a set of processing units, the verification program for verifying the correctness of a forwarding-element program to be executed by a control-plane circuit to configure a data-plane circuit of a forwarding element to forward data messages, the forwarding-element program specifying at least one element that is populated during execution by a control plane circuit, the verification program comprising a set of instructions that when executed by the set of processing units results in performance of operations comprising:
   receiving the forwarding-element program;
   annotating the forwarding-element program to reflect assumptions regarding control-plane behavior;
   translating the forwarding-element program and annotations into a different programming language that incorporates non-deterministic choice based on the assumptions regarding control plane behavior; and
   using the translated program to verify the correctness of the forwarding-element program and assumptions regarding the control plane behavior;

wherein:
the data-plane circuit comprises a plurality of programmable packet processing stages that comprise match-action tables that are to be configured by the control-plane circuit for use in forwarding the data messages; and the using the translated program to verify the correctness of the forwarding-element program and the assumptions regarding the control-plane behavior comprises verifying whether entries in the match-action tables depend on each other.

2. The non-transitory machine readable medium of claim 1, wherein the forwarding-element program specifies a set of tables to be executed by the data plane circuit, wherein the set of tables is populated by the control plane.

3. The non-transitory machine readable medium of claim 2, wherein for each table in the set of tables, a set of actions is specified in the forwarding-element program based on whether a match is found in the table.

4. The non-transitory machine readable medium of claim 3, wherein particular assumptions regarding control-plane behavior are assumptions regarding whether a match is found in a particular control-plane-populated table, wherein the set of non-deterministic choices reflect the different actions in the set of actions for the particular table.

5. The non-transitory machine readable medium of claim 2, wherein the translation and verification are performed before the tables are populated by the control plane.

6. The non-transitory machine readable medium of claim 5, wherein the correctness of the received forwarding-element program depends on the values used to populate, by the control plane, the tables specified in the forwarding-element program.

7. The non-transitory machine readable medium of claim 1, wherein the different programming language is guarded command language (GCL).

8. The non-transitory machine readable medium of claim 7, wherein the data-plane program is programmed in the P4 language.

9. The non-transitory machine readable medium of claim 1, wherein translating the received forwarding-element program comprises:
parsing the received forwarding-element program to identify a set of variables in the forwarding-element program; and
identifying, for the different programming language, the corresponding type of each variable in the set of variables to apply in translating the forwarding-element program.

10. The non-transitory machine readable medium of claim 1, wherein translating the received forwarding-element program comprises translating assumptions included in the received forwarding-element program into a set of assumptions in the different programming language.

11. The non-transitory machine readable medium of claim 1, wherein translating the received data-plane program further comprises adding variables in the translated program that track the execution of tables and actions to be used in verifying the correctness of the forwarding-element program.

12. The non-transitory machine readable medium of claim 11, wherein added variables that track the execution of a table record at least one of (i) whether the table was reached, (ii) which values were read by the table, (iii) whether the packet hit or missed, (iv) which action was executed, and (v) which action data was supplied to the action.

13. The non-transitory machine readable medium of claim 12, wherein the added variables are used to trace the operations of the received forwarding-element program.

14. The non-transitory machine readable medium of claim 12, wherein the verification program further comprises a set of instructions for:
displaying, when a forwarding-element program fails verification, a trace of the operations that caused the failure, the trace of operations based on the added variables.

15. The non-transitory machine readable medium of claim 1, wherein translating the received forwarding-element program comprises inlining the received forwarding-element program to eliminate at least a set of procedure calls and generate a single piece of translated code that fully captures the semantics of the received forwarding-element program.

16. The non-transitory machine readable medium of claim 1, wherein using the translated program to verify the correctness of the forwarding-element program comprises generating a set of conditions corresponding to both the received forwarding-element program and the translated program, the set of conditions being evaluated to verify the correctness of the received data-plane program.

17. The non-transitory machine readable medium of claim 16, wherein the set of conditions is a weakest set of conditions that are sufficient to insure that no assertions included in the translated program fail.

18. The non-transitory machine readable medium of claim 17, wherein the correctness of the data-plane program is verified using a satisfactory modulo theory (SMT) solver.

* * * * *